United States Patent
Hu

(10) Patent No.: US 11,023,170 B2
(45) Date of Patent: Jun. 1, 2021

(54) WRITING METHOD FOR MULTI-STREAM WRITE SOLID STATE DRIVE

(71) Applicants: Lite-On Electronics (Guangzhou) Limited, Guangzhou (CN); LITE-ON TECHNOLOGY CORPORATION, Taipei (TW)

(72) Inventor: Chih-Yuan Hu, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 111 days.

(21) Appl. No.: 16/458,826

(22) Filed: Jul. 1, 2019

(65) Prior Publication Data

US 2020/0326884 A1    Oct. 15, 2020

(30) Foreign Application Priority Data

Apr. 12, 2019 (CN) .......................... 201910298304.3

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0656* (2013.01); *G06F 3/0679* (2013.01)

(58) Field of Classification Search
CPC ...... G06F 3/0659; G06F 3/0604; G06F 3/064; G06F 3/0656; G06F 3/0679; G06F 12/0246
See application file for complete search history.

(56) References Cited

U.S. PATENT DOCUMENTS

| | | | |
|---|---|---|---|
| 2015/0074337 A1* | 3/2015 | Jo | G06F 3/0679 711/103 |
| 2016/0283116 A1* | 9/2016 | Ramalingam | G06F 3/0611 |
| 2016/0306552 A1* | 10/2016 | Liu | G06F 3/0679 |
| 2017/0371585 A1* | 12/2017 | Lazo | G06F 3/0659 |
| 2018/0150238 A1* | 5/2018 | Matsuyama | G06F 3/0656 |
| 2020/0201570 A1* | 6/2020 | Kim | G06F 12/0238 |

* cited by examiner

*Primary Examiner* — Tasnima Matin
(74) *Attorney, Agent, or Firm* — WPAT, PC

(57) ABSTRACT

A writing method for a solid state drive is provided. Firstly, a buffer is divided into plural buffering regions corresponding to plural data streams. Then, the write command is received from a host, and a write data corresponding to the stream information of the write command is stored into the corresponding buffering region of the buffer. Then, the write data in each buffering region of the buffer is divided into plural groups according to a program data amount. Then, one program command is assigned to each group in each buffering region, the program command and each group are combined as a job, and the job is listed in a stream job link list. Afterwards, the jobs corresponding to each data stream are transmitted to a non-volatile memory according to a content of the stream job link list.

4 Claims, 5 Drawing Sheets

WRITING METHOD FOR MULTI-STREAM WRITE SOLID STATE DRIVE

This application claims the benefit of People's Republic of China Patent Application No. 201910298304.3, filed Apr. 12, 2019, the subject matter of which is incorporated herein by reference.

FIELD OF THE INVENTION

The present invention relates to a writing method for a solid state drive, and more particularly to a writing method for a multi-stream write solid state drive.

BACKGROUND OF THE INVENTION

As is well known, a solid state drive (SSD) is a data storage device that uses a non-volatile memory to store data. After data are written to the flash memory, if no electric power is supplied to the flash memory, the data are still retained in the solid state drive.

FIG. 1A is a schematic function block diagram illustrating the architecture of a conventional solid state drive. As shown in FIG. 1A, the solid state drive 100 comprises a control circuit 120, a buffer 130 and a non-volatile memory 150. The non-volatile memory 150 comprises plural dies 11~14. For example, the plural dies 11~14 are NAND flash dies. The buffer 130 is a dynamic random access memory (DRAM) or another type of volatile memory. As shown in FIG. 1A, the buffer 130 is installed in the solid state drive 100. Alternatively, the buffer 130 is installed in a host 110.

The control circuit 120 is in communication with the host 110 through an external bus 115. Consequently, commands and data can be exchanged between the solid state drive 100 and the host 110. For example, the external bus 115 is a USB bus, an SATA bus, a PCIe bus, an M.2 bus, a U.2 bus, or the like.

In the solid state drive 100, the control circuit 120 is connected with the buffer 130 and the non-volatile memory 150. According to a write command from the host 110, the write data from the host 110 is temporarily stored in the buffer 130 by the control circuit 120. Then, the write data in the buffer 130 is stored to the non-volatile memory 150 by the control circuit 120. Moreover, according to a read command from the host 110, the control circuit 120 acquires a read data from the non-volatile memory 150. Then, the read data is transmitted from the control circuit 120 to the host 110.

FIG. 1B schematically illustrates the architecture of the die of the non-volatile memory as shown in FIG. 1A. The die 160 comprises plural blocks BLK0~BLKx. Each block comprises plural pages Page_0~Page_y. For example, each die contains 1024 blocks, and each block contains 256 pages. The data amount of each page is 16K bytes.

Generally, each die of the non-volatile memory 150 can execute an operation command for each time. The operation command is a program operation command, a read operation command or an erase operation command. For example, while the program operation command is executed to program the first page Page_1 of the first block BLK_1 in the die 160, the die 160 is in a busy state. At this moment, the other operation command cannot be executed on the die 160.

Generally, while the program operation command or the read operation command is executed on the die of the non-volatile memory 150, the program operation or the write operation is performed in unit of page. While the erase operation command is executed on the die of the non-volatile memory 150, the erase operation is performed in unit of block.

For increasing the writing speed and the writing efficiency of the solid state drive, the blocks of plural dies with the corresponding addresses are collaboratively defined as a superblock. Moreover, the pages of the plural blocks of each superblock with the corresponding addresses are defined as a superpage. Besides, in the multi-plane configuration, a single block or plural blocks corresponding to the plane in each die are selected, and the selected blocks of the plural dies are collaboratively defined as the superblock.

For example, the non-volatile memory contains p dies. Each die comprises q blocks. Each block contains r pages. In a 2-plane die configuration, each of the p dies provides two physical blocks, and these physical blocks of the p dies are collaboratively defined as a superblock. In other words, each superblock of the non-volatile memory contains 2p physical blocks. These 2p physical blocks belong to p dies. Since each die contains q blocks and each die provides two physical blocks, the non-volatile memory contains q/2 superblocks. Moreover, each superblock contains r superpages. Each superpage contains 2p physical pages. These 2p physical pages belong to 2p physical blocks.

For example, the die of the non-volatile memory 150 as shown in FIG. 1A has a 2-plane die configuration. The physical blocks BLK_0 and BLK_1 of the dies 11~14 are collaboratively formed as a superblock. The physical blocks BLK_2 and BLK_3 of the dies 11~14 are collaboratively formed as another superblock. The rest may be deduced by analogy. In the first superblock, the pages Page_0 of the physical blocks BLK_0 and BLK_1 of the dies 11~14 are collaboratively formed as a superpage. Moreover, the pages Page_1 of the physical blocks BLK_0 and BLK_1 of the dies 11~14 are collaboratively formed as another superpage. The rest may be deduced by analogy. Under this circumstance, the control circuit 120 performs the program operation or the write operation in unit of superpage, and the control circuit 120 performs the erase operation in unit of superblock. In case that the data amount of each page of the dies 11~14 is 16K bytes, the data amount of the superpage is 128K bytes (i.e., 2×4×16K bytes=128K bytes).

Generally, the control circuit 120 selects one of the plural superblocks as an open superblock for each time, and performs the program operation on the open superblock. At the same time, the superblocks that are not designated as the open superblock cannot undergo the program operation.

Generally, the write data to be transmitted from the host to the solid state drive is not classified. That is, the write data from the host contains a hot data and a cold data. In addition, the hot data and the cold data are stored in the same superblock of the non-volatile memory. The hot data is the data that is frequently refreshed. The cold data is the data that is almost not erased. For example, the data that is continuously computed by the host may be considered as the hot data, and the operation system (OS) file of the host may be considered as the cold data.

Since the hot data and the cold data are stored in the same superblock, the control circuit has to frequently perform a garbage collection (GC) operation and a wear leveling (WL) operation. Consequently, the use life of the non-volatile memory is deteriorated.

For solving the above drawbacks, the host provides different data streams to the solid state drive according to the characteristics of the write data. At the same time, plural superblocks of the solid state drive are designated as the open superblocks. Consequently, different data streams are stored into different open superblocks of the solid state drive, respectively.

As mentioned above, the plural blocks of each superblock belong to the corresponding dies, and only one operation command can be executed by die for each time. If plural superblocks are used as the open superblocks to store different data streams, some problems occur. For example, at one moment, different data streams possibly need to be written into different blocks of the same die, or there is no data steam is written to a specified die (i.e., in an idle state). Consequently, while the multi-stream write data is processed, the writing speed and the writing performance are impaired. Therefore, it is important to increase the writing speed and the writing performance of the multi-stream write solid state drive.

SUMMARY OF THE INVENTION

An embodiment of the present invention provides a writing method for a solid state drive. The solid state drive is connected with a host. The host issues a write command containing a stream information. The writing method includes the following steps. Firstly, a buffer is divided into plural buffering regions corresponding to plural data streams. Then, the write command is received from the host, and a write data corresponding to the stream information of the write command is stored into the corresponding buffering region of the buffer. Then, the write data in each buffering region of the buffer is divided into plural groups according to a program data amount. Then, one program command is assigned to each group in each buffering region, the program command and each group are combined as a job, and the job is listed in a stream job link list. Afterwards, the jobs corresponding to each data stream are transmitted to a non-volatile memory according to a content of the stream job link list.

Another embodiment of the present invention provides a writing method for a solid state drive. The solid state drive is connected with a host. The writing method includes the following steps. Firstly, a buffer into is divided into plural buffering regions corresponding to plural data streams. Then, a first write data is received from the host, and the first write data is stored into a first buffering region of the plural buffering regions of the buffer. Then, a second write data is generated according to an internal operation of the solid state drive, and the second write data is stored into a second buffering region of the plural buffering regions of the buffer. Then, the first write data in the first buffering region and the second write data in the second buffering region are divided into plural groups according to a program data amount. Then, one program command is assigned to each group in the first buffering region and the second buffering region, the program command and each group are combined as a job, and the job is listed in a stream job link list. Afterwards, the jobs corresponding to each data stream are transmitted to a non-volatile memory according to a content of the stream job link list.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
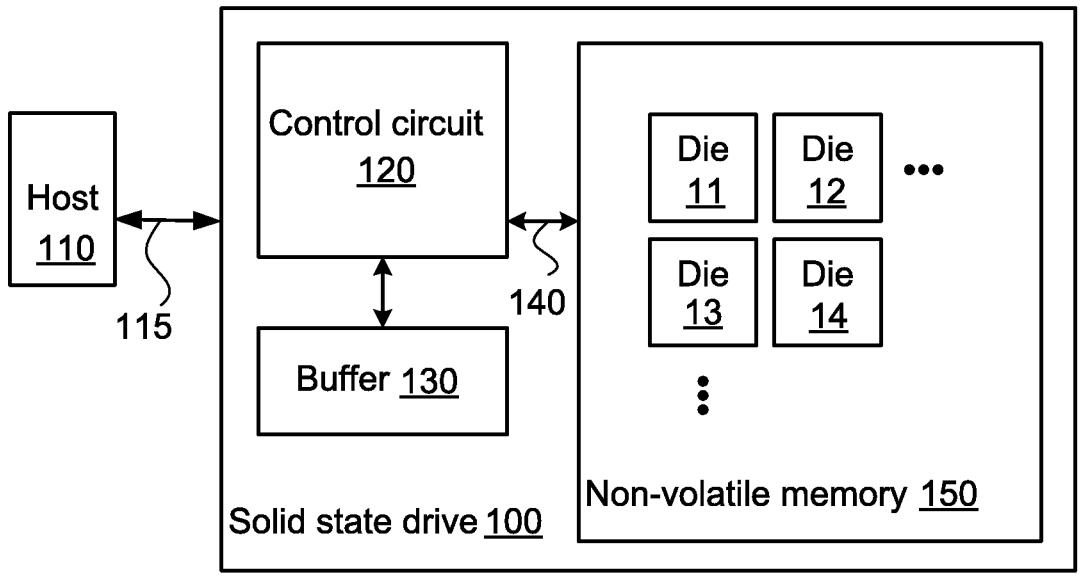
FIG. 1A (prior art) is a schematic function block diagram illustrating the architecture of a conventional solid state drive.
Figure 1B:
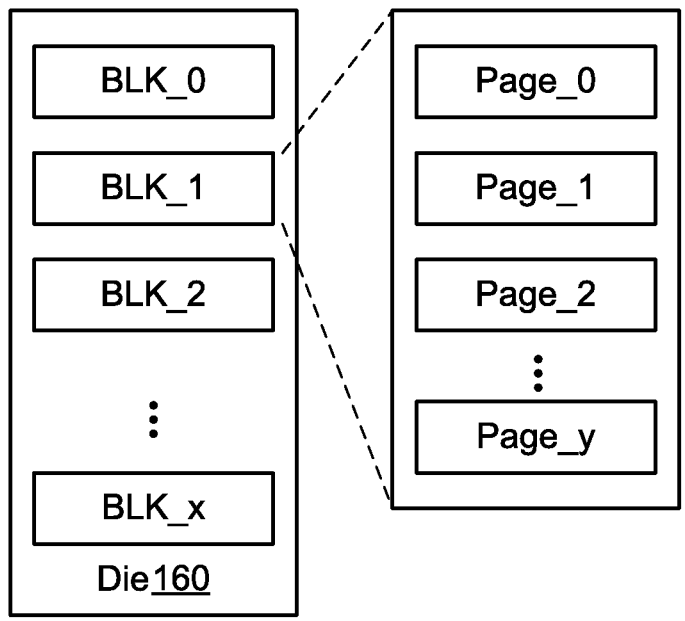
FIG. 1B (prior art) schematically illustrates the architecture of the die of the non-volatile memory as shown in FIG. 1A.
Figure 2:
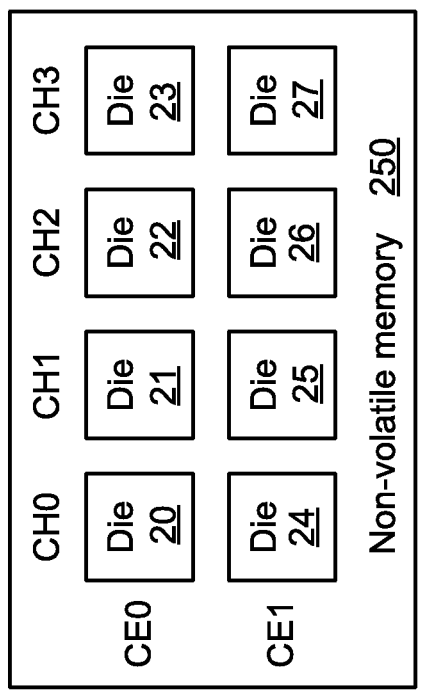
FIG. 2 schematically illustrates a die-based non-volatile memory according to an embodiment of the present invention.

FIG. 2 schematically illustrates a die-based non-volatile memory according to an embodiment of the present invention. As shown in FIG. 2, the non-volatile memory 250 comprises 8 dies 2~27. The non-volatile memory 250 is controlled according to four channels CH0~CH3 and two chip enable signals CE0 and CE1 corresponding to each channel. Consequently, the solid state drive with the non-volatile memory 250 is referred as a four-channel and two-chip-enable-signal solid state drive (4CH, 2CE SSD).

Generally, all channels can be operated independently to transfer the corresponding operation commands. For example, in case that the die 20 is enabled according to the chip enable signal CE0, the die 20 is controlled to execute the corresponding program command through the channel CH0.

For increasing the writing speed and the writing efficiency of the solid state drive, the blocks of the dies 20~27 with the corresponding addresses are collaboratively defined as a superblock. Moreover, the pages of the plural blocks of each superblock with the corresponding addresses are defined as a superpage. Besides, in the multi-plane configuration, a single block or plural blocks corresponding to the plane in each die are selected, and the selected blocks of the plural dies are collaboratively defined as the superblock.

In the multi-stream write configuration, at least two superblocks corresponding to at least two data streams are defined as the open superblocks, and the write data of the at least two data streams are written into the corresponding open superblocks respectively. In other words, the write data of each data stream is programmed to the corresponding open superblock.

The die-based non-volatile memory is operated by die, and the working unit of the die-based non-volatile memory is the die. That is, each die can execute only one operation command for each time. But all dies can execute its one operation command at the same time.

In the die-based non-volatile memory, a job is defined according to the unit program data amount of the die (the working unit), and the program operation is performed on the die of the corresponding open superblock according to the job. For example, the data amount of each page of the die is 16K bytes. That is, the program data amount is 16K bytes, and the write data is divided into plural groups of program data according to the program data amount. In the multi-plane configuration, where M blocks corresponding to the plane in each die are selected and collaboratively defined as the superblock, the program data amount is M×16K bytes, and the write data is divided into plural groups of program data according to the program data amount. Then, one program command is assigned to each group, and the group and the program command are defined as a job. Then, the job is assigned to the die of the open superblock.

Figure 3:
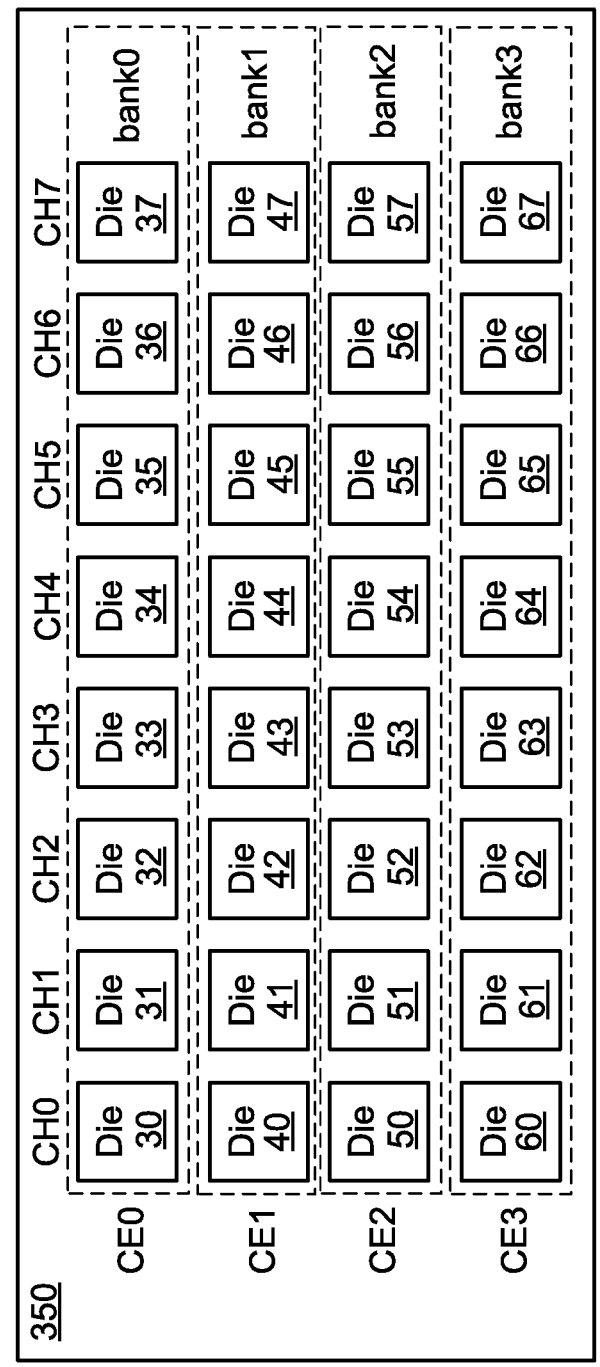
FIG. 3 schematically illustrates a bank-based non-volatile memory according to an embodiment of the present invention.

FIG. 3 schematically illustrates a bank-based non-volatile memory according to an embodiment of the present invention. As shown in FIG. 3, the non-volatile memory 350 comprises 32 dies 30~67. The non-volatile memory 350 is controlled according to eight channels CH0~CH7 and four chip enable signals CE0~CE3 corresponding to each channel. Consequently, the solid state drive with the non-volatile memory 350 is referred as an eight-channel and four-chip-enable-signal solid state drive (8CH, 4CE SSD).

For processing more data, the eight dies 30~37 operated according to the chip enable signal CE0 are collaboratively formed as a bank (e.g., bank0). The eight dies 40~47 operated according to the chip enable signal CE1 are collaboratively formed as another bank (e.g., bank1). The rest may be deduced by analogy.

For increasing the writing speed and the writing efficiency of the solid state drive, the blocks of the dies 30~67 with the corresponding addresses are collaboratively defined as a superblock. Moreover, the pages of the plural blocks of each superblock with the corresponding addresses are defined as a superpage. Besides, in the multi-plane configuration, a single block or plural blocks corresponding to the plane in each die is selected, and the selected blocks of the plural dies are collaboratively defined as the superblock.

In the multi-stream write configuration, at least two superblocks of the non-volatile memory 350 corresponding to at least two data streams are defined as the open superblocks, and the write data of the at least two data streams are written into the corresponding open superblocks respectively. In other words, the write data of each data stream is programmed to the corresponding open superblock.

The bank-based non-volatile memory is operated by bank, and the working unit of the bank-based non-volatile memory is the bank. That is, each bank can execute only one operation command for each time. But all banks can execute its one operation command at the same time.

In the bank-based non-volatile memory, a job is defined according to the unit program data amount of the bank (the working unit), and the program operation is performed on the bank of the corresponding open superblock according to the job. For example, each bank contains 8 pages, and the data amount of each page of the die is 16K bytes. That is, the program data amount is 128K bytes (i.e., 8×16K bytes=128K bytes), and the write data is divided into plural groups of program data according to the program data amount. In the multi-plane configuration, where M blocks corresponding to the plane in each die are selected and collaboratively defined as the superblock, the program data amount is M×128K bytes, and the write data is divided into plural groups of program data according to the program data amount. Then, one program command is assigned to each group, and the group and the program command are defined as a job. Then, the job is assigned to the bank of the open superblock.

In the multi-stream write configuration, the data streams are independently programmed to the corresponding open superblocks. That is, different jobs are formed according to the corresponding data streams, and the program operations are performed on the corresponding open superblocks according to the jobs. Due to the characteristics of the non-volatile memory, the program operation is performed in unit of superpage.

Figure 4A:
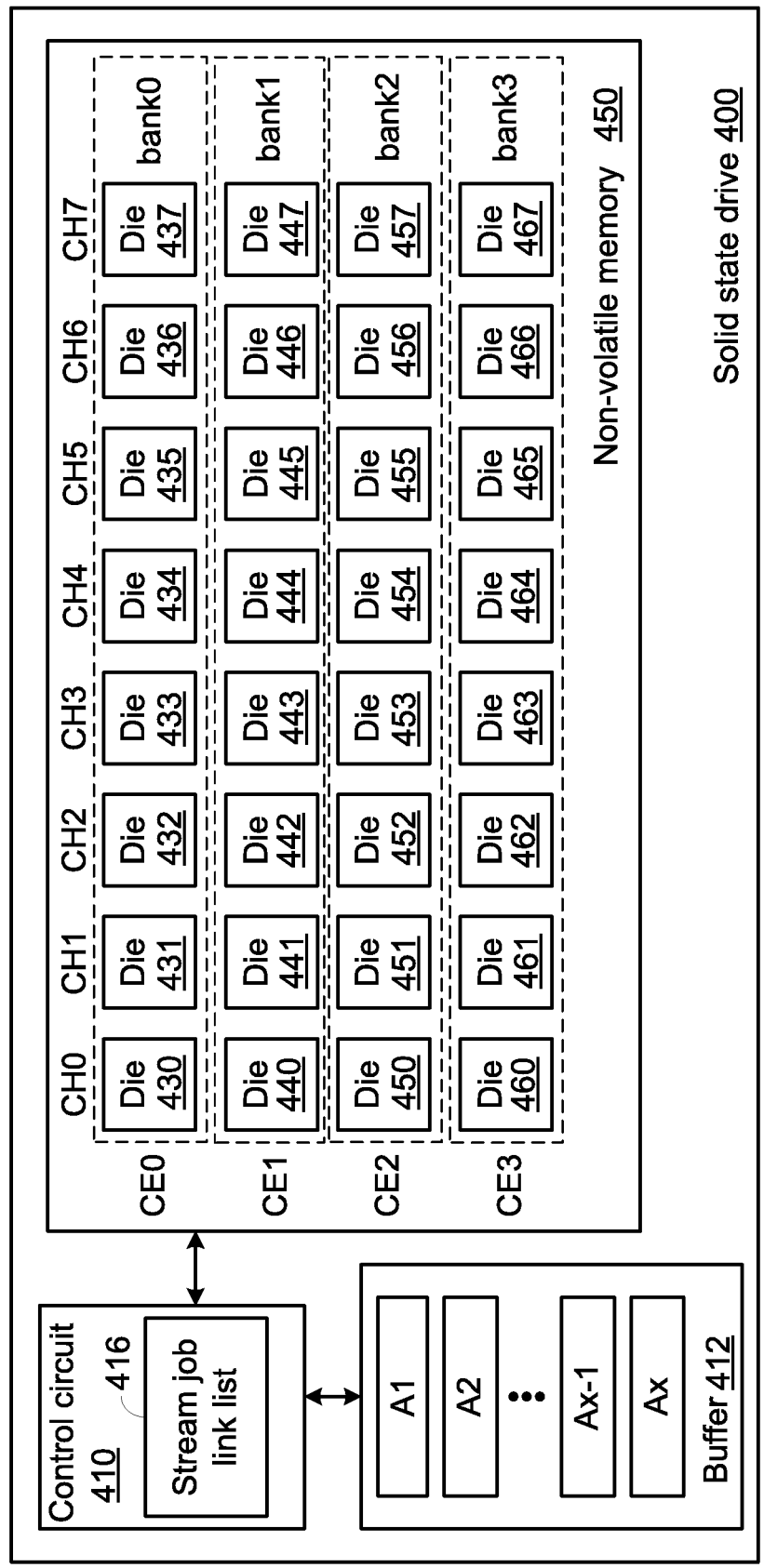
FIG. 4A is a schematic function block diagram illustrating the architecture of a multi-stream write solid state drive according to an embodiment of the present invention.

FIG. 4A is a schematic function block diagram illustrating the architecture of a multi-stream write solid state drive according to an embodiment of the present invention. The solid state drive 400 comprises a control circuit 410, a buffer 412 and a non-volatile memory 450. The non-volatile memory 450 comprises 32 dies 430~467. Moreover, the 32 dies 430~467 are defined into four banks bank0~bank3. The non-volatile memory 450 is controlled according to eight channels CH0~CH7 and four chip enable signals CE0~CE3 corresponding to each channel. Consequently, the solid state drive 400 with the non-volatile memory 450 is referred as an eight-channel and four-chip-enable-signal solid state drive (8CH, 4CE SSD).

It is noted that the architecture of the dies in the non-volatile memory is not restricted. For example, the solid state drive is a four-channel and two-chip-enable-signal solid state drive (4CH, 2CE SSD) or any other appropriate solid state drive. Moreover, the working unit of the non-volatile memory may be the die, the bank or any other appropriate working unit. Moreover, the unit program data amount of the same working unit of the non-volatile memory may be different according to the architecture of the non-volatile memory and/or the architecture of the die. Consequently, the unit program data amount is not restricted.

Hereinafter, the eight-channel and four-chip-enable-signal solid state drive (8CH, 4CE SSD) is taken as an example for illustration.

In this embodiment, the solid state drive 400 is connected with a host (not shown). The write command from the host contains a stream information. According to the stream information, the control circuit 410 confirms the data streams and stores the write data of different data streams into the corresponding open superblocks of the non-volatile memory 450.

As mentioned above, the control circuit 410 can generate the write data of plural data streams according to the stream information from the host. Besides, the control circuit 410 also can generate the write data of plural data streams according to the internal operation of the solid state drive 400. For example, while the control circuit 410 performs a garbage collection operation on the non-volatile memory 450, the valid data are collected as the write data of an additional data stream. The write data of the additional data stream and the write data of the single or plural data streams from the host are combined as the write data of plural data streams. In addition, the write data of different data streams are stored in the corresponding open superblocks of the non-volatile memory 450. That is, after the garbage collection operation is performed, the collected valid data are independently stored in the corresponding superblock. Moreover, the internal operation of the solid state drive 400 is not restricted to the garbage collection operation.

In this embodiment, the solid state drive 400 is an x-stream write solid state drive, and the buffer 412 is divided into plural buffering regions A1~Ax. Moreover, the control circuit 410 further comprises a stream job link list 416 for managing the jobs corresponding to all data streams.

Figure 4B:
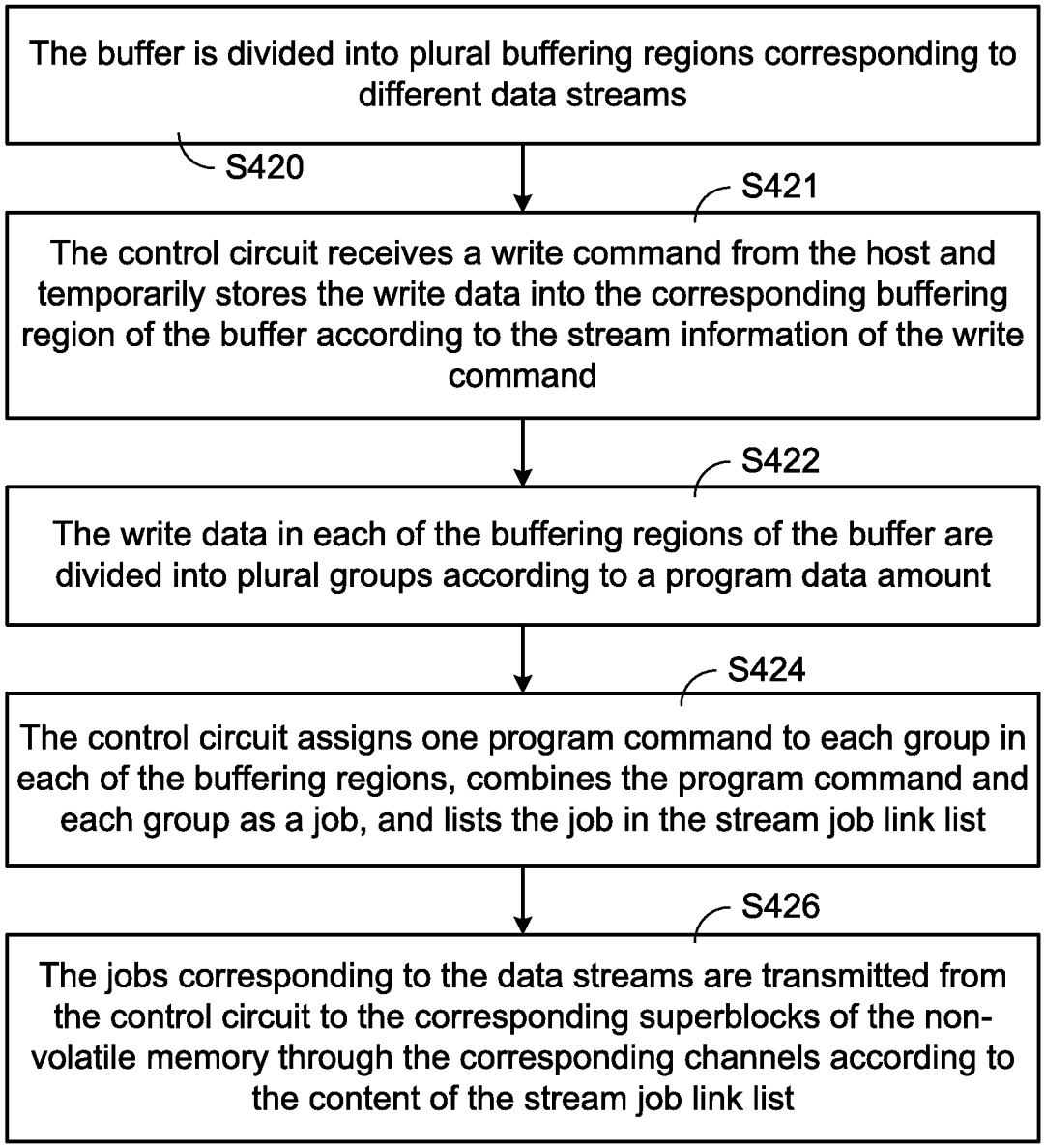
FIG. 4B is a flowchart illustrating a writing method for the multi-stream write solid state drive according to the embodiment of the present invention.

FIG. 4B is a flowchart illustrating a writing method for the multi-stream write solid state drive according to the embodiment of the present invention.

Firstly, the buffer 412 is divided into plural buffering regions corresponding to different data streams (Step S420).

Then, the control circuit 410 receives a write command from the host and temporarily stores the write data into the corresponding buffering region of the buffer 412 according to the stream information of the write command (Step S421). In addition, when an internal operation of the solid state drive 400 is performed, the corresponding write data is generated and defined as the corresponding data stream by the control circuit 410 and temporarily stored in the corresponding buffering region of the buffer 412.

For example, when the host issues the write command corresponding to the stream information 1, the control circuit 410 confirms that the received write data belongs to the first data stream and temporarily stores the write data of the first data stream into the first buffering region A1 of the buffer 412. Similarly, when the host issues the write command corresponding to the stream information (x−1), the control circuit 410 confirms that the received write data belongs to the (x−1)-th data stream and temporarily stores the write data of the (x−1)-th data stream into the (x−1)-th buffering region Ax-1 of the buffer 412. Moreover, when an internal operation of the solid state drive 400 is performed, the control circuit 410 confirms that the generated write data corresponding to the internal operation belongs to the x-th data stream and temporarily stores the write data of the x-th data stream into the x-th buffering region Ax of the buffer 412.

Moreover, the write data in the buffering regions A1~Ax of the buffer 412 are individually processed by the control circuit 410. That is, the write data in each of the buffering regions A1~Ax of the buffer 412 are divided into plural groups by the control circuit 410 according to a program data amount (Step S422). In an embodiment, the program data amount is determined according to the unit program data amount of the working unit of the non-volatile memory. Since the unit program data amount of the working unit of the non-volatile memory may be different according to the architecture of the non-volatile memory or the architecture of the die, the unit program data amount is not restricted.

For example, the data amount of each page of the die is 16K bytes. In an embodiment, the program data amount is set as 16K bytes, and the write data in each of the buffering regions A1~Ax of the buffer 412 are divided into plural groups of program data by the control circuit 410. For example, the data amount of a bank with eight pages is 128K bytes (i.e., 8×16K bytes=128K bytes). In another embodiment, the program data amount is set as 128K bytes, and the write data in each of the buffering regions A1~Ax of the buffer 412 are divided into plural groups of program data by the control circuit 410. In another embodiment, in the multi-plane configuration, where M blocks corresponding to the plane in each die are selected and collaboratively defined as the superblock, the program data amount is set as M×16K bytes or M×128K bytes.

Then, the control circuit 410 assigns one program command to each group in each of the buffering regions A1~Ax, combines the program command and each group as a job, and lists the job in the stream job link list (Step S424).

Then, the jobs of the data streams are transmitted from the control circuit 410 to the corresponding superblocks of the non-volatile memory 450 through the corresponding channels according to the content of the stream job link list (Step S426).

For describing the stream job link list 416 of the solid state drive 400 and the job dispatching method, four data streams will be exemplified as follows.

Figures 5A, 5B:
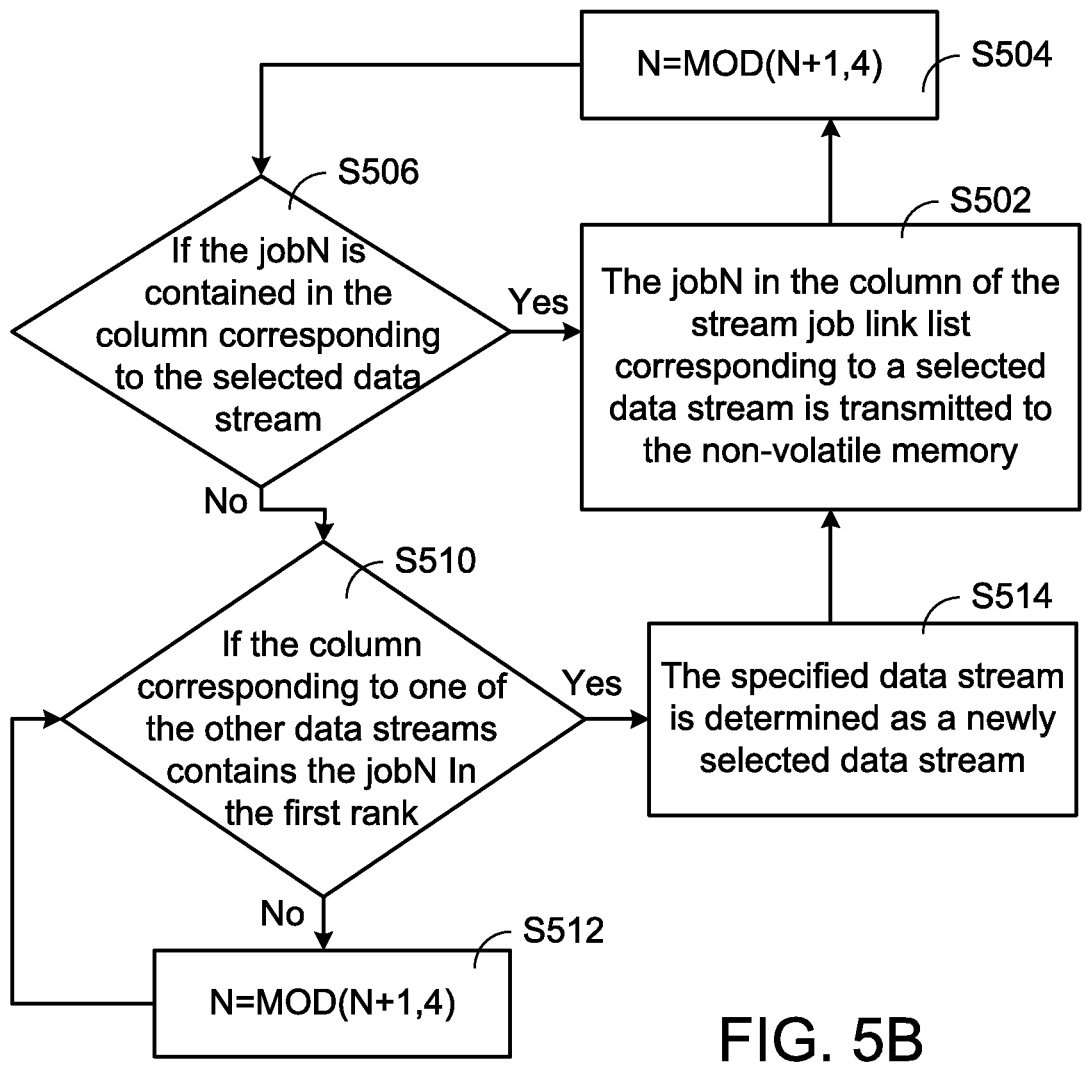
FIG. 5A schematically illustrates a stream job link list of the solid state drive according to the embodiment of the present invention.
FIG. 5B is a flowchart illustrating a job dispatching method for the solid state drive according to the embodiment of the present invention.

Please refer to FIGS. 5A and 5B. FIG. 5A schematically illustrates a stream job link list of the solid state drive according to the embodiment of the present invention. FIG. 5B is a flowchart illustrating a job dispatching method for the solid state drive according to the embodiment of the present invention.

Due to the characteristics of the non-volatile memory, the program operation is performed on the superblock in unit of superpage. That is, after one superpage is program, the program operation is performed on the next superpage. It is assumed that a job is defined by the control circuit 410 according to the program data amount of one bank. As an embodiment shown in FIG. 4A, since the non-volatile memory 450 contains four banks (e.g., bank0~bank3), four jobs are cyclically executed by the control circuit 410. That is, the four jobs of each data stream can be programmed to one superpage of one superblock. For example, the four jobs (e.g., job0~job3) in a cycle and in the write data of each data stream are correlated with the four banks (e.g., bank0~bank3) and programmed to a superpage of an open superblock. Moreover, the four jobs (e.g., job0~job3) in the next cycle are correlated with the four banks (e.g., bank0~bank3) and programmed to the next superpage of the same open superblock.

Please refer to the stream job link list as shown in FIG. 5A. The column of the stream job link list corresponding to the first data stream (e.g., stream1) indicates that job0 has not been processed. The column of the stream job link list corresponding to the second data stream (e.g., stream2) indicates that job2, job3 and job0 have not been processed. The column of the stream job link list corresponding to the third data stream (e.g., stream3) indicates that job3, job0 and job1 have not been processed. The column of the stream job link list corresponding to the fourth data stream (e.g., stream4) indicates that job1 and job2 have not been processed.

In the column corresponding to the second data stream (e.g., stream2), job2 and job3 are correlated to the same superpage of the open superblock and respectively programmed to the bank2 and the bank3, and job0 is correlated to the next superpage of the open superblock and programmed to bank0. In the column corresponding to stream3, job3 is correlated to a superpage of another open superblock and programmed to bank3, and job0 and job1 are correlated to the next superpage of another open superblock and respectively programmed to bank0 and bank1.

After a job is transmitted to the non-volatile memory 450, the job is removed from the stream job link list. When a new job is generated, the new job is successively arranged in the corresponding stream column of the stream job link list.

As mentioned above, the four data streams (e.g., stream1~stream3) in the stream job link list are correlated to four superblocks, respectively. The write data of stream1~stream3 are stored into the corresponding superblocks. In each of the four data streams (e.g., stream1~stream3), the write data is divided into jobs according to the program data amount of the working unit (e.g., the bank or the die) of the non-volatile memory. Consequently, each jobs (e.g., job0~job3) is correlated to one working unit (e.g., a bank or a die) and programmed to the corresponding one working unit (e.g., the corresponding bank or the corresponding die). Moreover, in each of the four data streams (e.g., stream1~stream3), the four jobs (e.g., job0~job3) in a cycle are programmed to a superpage. That is, after the four jobs (e.g., job0~job3) in a cycle are completely programed, the program operation on the superpage is completed.

For increasing the writing speed and the writing performance, all jobs are sequentially transmitted from the control circuit 410 to the non-volatile memory 450 according to the ranks of the jobs in the column of the stream job link list corresponding to a selected data stream, and then a newly selected data stream is selected from other data streams by the control circuit 410. Moreover, the newly selected data stream is determined according to the job number of the last-rank job in the currently selected data stream.

If the job number of the first-rank job in a specified data stream of the other data streams is just next to the job number of the last-rank job in the currently selected data stream, the specified data stream is determined as the newly selected data stream.

As shown in FIG. 5B, the number N denotes plural values corresponding to the number of jobs in a cycle. For example, in the eight-channel and four-chip-enable-signal solid state drive 400 as shown in FIG. 4A, the number of jobs in a cycle is 4. The function MOD(N+1,4) as shown in FIG. 5B denotes the remainder after division of (N+1) by 4. That is, N is gradually increased from 0 to 3, and then changed to 0. The rest may be deduced by analogy.

Please refer to FIG. 5B. Firstly, the jobN in the column of the stream job link list corresponding to a selected data stream is transmitted from the control circuit 410 to the non-volatile memory 450 (Step S502). Then, next number N is derived by the control circuit 410 (Step S504). Then, the control circuit 410 judges whether the jobN is contained in the column corresponding to the selected data stream (Step S506).

If the judging result of the step S506 is satisfied, the step S502 is repeatedly done. Whereas, if the judging result of the step S506 is not satisfied, the control circuit 410 judges whether the column corresponding to one of the other data streams contains the jobN in the first rank (Step S510).

If the judging result of the step S510 indicates that the column corresponding to a specified data stream contains the jobN in the first rank, the specified data stream is determined as a newly selected data stream by the control circuit 410 (Step S514) and the step S502 is repeatedly done. Whereas, if the judging result of the step S510 is not satisfied, next number N is derived and the step S510 is repeatedly performed to search the newly selected data stream.

Hereinafter, the job dispatching method of FIG. 5B will be illustrated according to the stream job link list of FIG. 5A. Firstly, the selected data stream is the second data stream (i.e., stream2). Consequently, the job2 (i.e., N=2) in the column of the stream job link list corresponding to a selected data stream (i.e., stream2) is transmitted from the control circuit 410 to the non-volatile memory 450 (Step S502). Then, N is changed to 3 (Step S504).

Then, the control circuit 410 judges that the job3 (i.e., N=3) is contained in the column corresponding to the selected data stream (i.e., stream2) (Step S506). Consequently, the job3 (i.e., N=3) in the column of the stream job link list corresponding to a selected data stream (i.e., stream2) is transmitted from the control circuit 410 to the non-volatile memory 450 (Step S502). Then, N is changed to 0 (Step S504).

Then, the control circuit 410 judges that the job0 (i.e., N=0) is contained in the column corresponding to the selected data stream (i.e., stream2) (Step S506). Consequently, the job0 (i.e., N=0) in the column of the stream job link list corresponding to a selected data stream (i.e., stream2) is transmitted from the control circuit 410 to the non-volatile memory 450 (Step S502). Then, N is changed to 1 (Step S504).

Then, the control circuit 410 judges that the job1 (i.e., N=1) is not contained in the column corresponding to the selected data stream (i.e., stream2) (Step S506). Then, the control circuit 410 judges whether the column corresponding to one of the other data streams contains the job1 (i.e., N=1) in the first rank (Step S510).

Then, the control circuit 410 confirms that the column corresponding to the fourth data stream (i.e., stream4) contains the job1 (i.e., N=1) in the first rank. Consequently, the fourth data stream (i.e., stream4) is determined as a newly selected data stream by the control circuit 410 (Step S514). Consequently, the job1 (i.e., N=1) in the column of the stream job link list corresponding to the selected data stream (i.e., stream4) is transmitted from the control circuit 410 to the non-volatile memory 450 (Step S502). Then, N is changed to 2 (Step S504). Then, the step S506 is repeatedly done.

In other words, the control circuit 410 transmits the jobs according to the following sequence: the job2 (i.e., N=2) in the column corresponding to the second data stream (i.e., stream2), the job3 (i.e., N=3) in the column corresponding to the second data stream (i.e., stream2), the job0 (i.e., N=0) in the column corresponding to the second data stream (i.e., stream2), the job1 (i.e., N=1) in the column corresponding to the fourth data stream (i.e., stream4), the job2 (i.e., N=2) in the column corresponding to the fourth data stream (i.e., stream4), the job3 (i.e., N=3) in the column corresponding to the third data stream (i.e., stream3), the job0 (i.e., N=0) in the column corresponding to the third data stream (i.e., stream3), the job1 (i.e., N=1) in the column corresponding to the third data stream (i.e., stream3) and the job0 (i.e., N=0) in the column corresponding to the first data stream (i.e., stream1). Obviously, in most situations, the jobs in the consecutive job numbers are sequentially transmitted from the control circuit 410 to the non-volatile memory 450. Moreover, as the four jobs (i.e., job0~job3) are programmed to the corresponding banks (i.e., bank0~bank3), the four banks (i.e., bank0~bank3) can operate at the same time.

From the above descriptions, the present invention provides a writing method for a multi-stream write solid state drive. The solid state drive generates the write data of plural data streams according to the stream information of the write command. In addition, the solid state drive generates the write data of plural data streams according to the internal operation of the solid state drive. By using the job dispatching method of FIG. 5B, the jobs in the consecutive job numbers are sequentially transmitted from the control circuit to the non-volatile memory. Consequently, all working units (e.g., dies or banks) have jobs that are simultaneously executed and will not be in the busy state when the job is received. Consequently, the write performance of the solid state drive is optimized.

For performing the program operation, a job is defined according to the program data amount of the working unit (e.g., the bank or the die) of the non-volatile memory. In the above embodiment, the job is defined according to the program data amount of a bank. In some embodiments, the job is defined according to the program data amount of a die. In case the solid state drive is the eight-channel and four-chip-enable-signal solid state drive (8CH, 4CE SSD) and the working unit is the die, each data stream contains 32 jobs (i.e., job0~job31) to program a superpage. Moreover, the number N is gradually increased from 0 to 31, and then changed to 0. The rest may be deduced by analogy. Consequently, the write data of different data streams can be stored into different open superblocks of the non-volatile memory at the better writing efficiency.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A writing method for a solid state drive, the solid state drive being connected with a host, the host issuing a write command containing a stream information of one of a plurality of data streams, the writing method comprising steps of:

receiving the write command from the host, and storing a write data of the write command into a corresponding buffering region of a buffer according to the stream information of the write command, wherein the buffer contains a plurality of buffering regions corresponding to the plurality of data streams;

dividing the write data in each buffering region of the buffer into plural groups according to a program data amount;

assigning one program command to each group in each buffering region, combining the program command and each group as a job, and listing the job with a corresponding job number in a stream job link list, wherein the stream job link list contains a plurality of job link lists corresponding to the plurality of data streams; and determining a next job link list to execute the corresponding jobs according to a job number of a last-rank job of a selected job link list that is selected in a former one determining process.

2. The writing method as claimed in claim 1, wherein the next job link list is determined also according to the job number of a first-rank job of each of a plurality of non-selected job link lists that are not selected in the former one determining process.

3. The writing method as claimed in claim 1, wherein the non-volatile memory contains plural dies, and a unit program data amount of one die is the program data amount.

4. The writing method as claimed in claim 1, wherein the non-volatile memory contains plural dies, and portions of the plural dies are collaboratively formed as a bank, wherein a unit program data amount of the bank is the program data amount.

* * * * *